April 26, 1960   A. G. STERNBERG   2,934,452
RESURFACED CONCRETE STRUCTURE
Filed Dec. 14, 1956
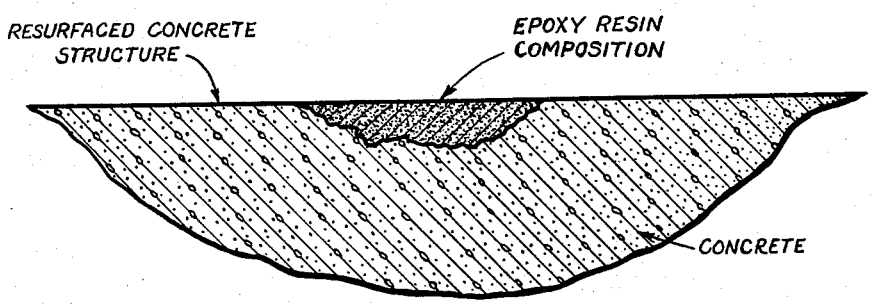

United States Patent Office 2,934,452
Patented Apr. 26, 1960

2,934,452
RESURFACED CONCRETE STRUCTURE

Alexander G. Sternberg, Kirkwood, Mo., assignor to Steelcote Manufacturing Company, St. Louis, Mo., a corporation of Missouri Application December 14, 1956, Serial No. 628,274

5 Claims. (Cl. 117—2)

This invention relates to resurfaced concrete structures and to a method for patching, repairing and resurfacing concrete surfaces.

Briefly, the invention is directed to resurfaced concrete structures of the type described comprising a layer of a cured composition consisting essentially of a liquid epoxy resin, a liquid polyamide resin having an amine value greater than approximately 83, a filler and not more than about 1% of an alkyl phthalate. The invention also includes a novel method of resurfacing and patching damaged concrete surfaces.

Among the several objects of the invention may be noted the provision of methods for patching, repairing and resurfacing concrete surfaces; the provision of such structures in which the cured compositions exhibit good adhesion to concrete surfaces; the provision of such patched structures which possess a high chemical resistance to acids, both organic and inorganic, and alkalies; the provision of methods of the type described which give a tough resilient patched surface which does not crack or chip under impact, the provision of such compositions which are water resistant, corrosion resistant, and resistant to shrinkage; the provision of such methods in which the compositions may be readily trowelled onto a rough surface or onto a slick, ornamental surface and may be applied to both dry and damp surfaces; and the provision of such methods which are economical and convenient to use. Other objects and features will be in part apparent and in part pointed out hereinafter.

The invention accordingly comprises the products and methods hereinafter described, the scope of the invention being indicated in the following claims.

In the accompanying drawing, in which one of various possible embodiments of the invention is illustrated, the single figure is a cross section of a resurfaced concrete structure of the present invention.

In accordance with the present invention, patching, resurfacing and repairing methods of damaged concrete surfaces are provided which are highly useful in various applications such as, for example, patching floors, walls, and repairing and relining tanks of concrete.

Any liquid epoxy resin (i.e., reaction product of epichlorohydrin and bisphenol in which polymerization is stopped before a solid product of higher molecular weight is obtained) may be employed in the invention. It is essential that the epoxy resin employed be liquid in order that the compositions of the invention may be applied to damp concrete surfaces. Exemplary of liquid epoxy resins useful in the invention are those sold under the trade designations "Epon 562, 815, 828 and 834" by Shell Chemical Corps., "ERL 2795" by Bakelite Co. and "6005" by Ciba Co. It will be understood that other liquid epoxy resins, which are liquid at room temperature (i.e., have a melting point not greater than approximately 28° C.) and have an epoxide equivalent value not greater than about 290, may also be employed in the structures and methods of the invention.

As the polyamide resin component of my compositions, any liquid polymeric polyamide curing agent or resin having an amine value greater than 83 may be used in the invention. "Amine value" may be defined as the mg. of potassium hydroxide equivalent to the amine alkalinity in one gram of sample, using bromcresol green (1% in water) as indicator. Polyamide resins are prepared by methods known to the art through the condensation of dimer acids with polyamines and may contain a small proportion of free polyamine. Liquid polyamide resins having an amine value greater than approximately 83 have been found useful since they do not give off excessive quantities of heat during mixing with the other components of my compositions and permit the compositions to be applied to wet surfaces. Among the liquid polyamide resins of this type which have been found useful in the practice of the present invention may be mentioned those marketed under the trade designations "Versamid 115," "Versamid 125," "Versamid 210" by General Mills, Inc. Other liquid polyamide resins having an amine value greater than 83 may also be used.

Various fillers may be used in accordance with the purpose for which the compositions are to be employed. For use in patching, resurfacing or repairing concrete floors or walls and for relining tanks, and the like, I prefer to use as a filler sand washed free of soluble salts and having a particle size of 30 mesh or smaller. Ground rock or ground flint of this particle size may also be employed as fillers in place of sand. Optionally, a second filler of finer particle size may also be included to give better packing during application of the composition to a surface. For this purpose, aluminum silicate, calcium silicate or magnesium silicate, 100% having a particle size less than 200 mesh and the bulk having a particle size less than 325 mesh, may be used. A coloring pigment may be included as a further optional component to give the finished product any desired color. Exemplary pigments include carbon black, iron oxide or titanium. Small amounts of a nonvolatile alkyl phthalate thinner or plasticizer such as dioctyl phthalate, dibutyl phthalate or the like may be added to the epoxy resin component of the composition to improve the flow and handling characteristics thereof.

Patching or repairing compositions of the above description are preferably prepared for use in the form of three components. For example, the epoxy resin and a nonvolatile thinner such as dibutyl phthalate, if included in these compositions, may be mixed together and magnesium silicate may be added thereto to form one component. A second component may consist of a mixture of sand washed free of soluble salts and a coloring pigment. The liquid polyamide resin having an amine value greater than approximately 83 constitutes the third component. The composition is then prepared for use by thoroughly mixing the polyamide resin and epoxy resin components and then adding the resulting mixture to the sand component and again mixing thoroughly. As thus prepared, the compositions may be readily worked for one hour after being applied to a surface and then begin to stiffen somewhat. Complete curing or setting of the compositions requires from two hours to overnight at room temperatures, but curing may be accelerated appreciably with the application of heat.

The above described patching and resurfacing compositions have been found to possess many advantageous properties. They exhibit extremely good adhesion to concrete, and have a high chemical resistance to acids, including both inorganic and organic acids, and alkalies. Also, these compositions provide a tough resilient patch which does not crack or chip under impact. Such a resurfaced concrete structure is generally indicated in the drawing. Moreover, the compositions are water resistant and resistant to shrinkage, and may therefore be used in patching or resurfacing the walls of swimming pools, for example. Further, the compositions are easy and convenient to use and may be trowelled onto a rough, antislip surface or a slick ornamental surface.

Compositions possessing unique advantages are also obtained when a low density filler such as vermiculite or volcanic ash is included.

In general, the percentage by weight ranges for the components of the compositions utilized in my invention are as follows: liquid epoxy resin: 8–80% by weight; liquid polyamide resin having an amine value greater than approximately 83: 4–60% by weight; and filler: small amounts to not more than 80% by weight. Preferably, the compositions contain approximately 13% by weight of a liquid epoxy resin, approximately 7% by weight of a liquid polyamide resin having an amine value greater than approximately 83 and approximately 80% by weight of a filler. Optionally, the compositions may contain 0–27% by weight of a filler of smaller particle size such as aluminum silicate, calcium silicate or magnesium silicate, minor amounts on the order of 1–2% by weight of a coloring pigment and minor amounts on the order of 1% by weight of a nonvolatile alkyl phthalate thinner for the liquid epoxy resin component.

When sand washed free of soluble salts, ground rock or ground flint is employed as the filler component, I prefer to include approximately 50–80% by weight in the compositions; and when vermiculite or other low density fillers are used, approximately 20% by weight is preferably included.

The following examples illustrate the invention.

*Example 1*

A composition useful for patching, repairing and resurfacing concrete surfaces was prepared having the following components and composition:

COMPONENT 1

| Ingredient | Amount, lbs. |
| --- | --- |
| Liquid epoxy resin (marketed under the trade designation "Epon 815" by Shell Chemical Corp.) | 224 |
| Dibutyl phthalate | 15 |
| Magnesium silicate | 272 |

COMPONENT 2

| Ingredient | Amount, lbs. |
| --- | --- |
| Liquid polyamide resin (marketed under the trade designation "Versamid 125" by General Mills, Inc.) | 120 |

COMPONENT 3

| Ingredient | Amount, lbs. |
| --- | --- |
| White sand washed free of soluble salts | 960 |
| Red oxide of iron | 30 |

Each of the above three components was packaged in separate containers, containing 2 lbs., 8½ oz. of component 1, 9½ oz. of component 2 and 10 lbs. of component 3, respectively. When ready for use, component 1 and component 2 are thoroughly mixed in the above amounts, and 5 lbs. of component 3 are added followed by thorough mixing. The resulting mixture is then ready for application to a concrete surface. As applied, the composition has the following percentage by weight composition:

Ingredient: Percent by weight
    Liquid epoxy resin _____ 13.8
    Liquid polyamide resin _____ 7.4
    Sand _____ 59.2
    Magnesium silicate _____ 16.7
    Red oxide of iron _____ 1.9
    Dibutyl phthalate _____ 1.0

*Example 2*

A composition useful for patching, repairing and resurfacing concrete surfaces was prepared having the following components and composition:

COMPONENT 1

| Ingredient | Amount, lbs. |
| --- | --- |
| Liquid epoxy resin (marketed under the trade designation "ERL 2795" by Bakelite Co.) | 224 |
| Dibutyl phthalate | 15 |
| Aluminum silicate | 150 |

COMPONENT 2

| Ingredient | Amount, lbs. |
| --- | --- |
| Liquid polyamide resin (marketed under the trade designation "Versamid 115" by General Mills, Inc.) | 120 |

COMPONENT 3

| Ingredient | Amount, lbs. |
| --- | --- |
| White sand washed free of soluble salts | 960 |
| Carbon black | 30 |

Each of the above three components was packaged in separate containers containing proportionate amounts thereof as in Example 1. The components were mixed as in Example 1 and as applied had the following percentage by weight composition.

Ingredient: Percent by weight
    Liquid epoxy resin _____ 14.96
    Liquid polyamide resin _____ 8.00
    Sand _____ 64.04
    Aluminum silicate _____ 10.00
    Carbon black _____ 2.00
    Dibutyl phthalate _____ 1.00

*Example 3*

A composition useful for patching, repairing and resurfacing concrete surfaces was prepared having the following components and composition:

COMPONENT 1

| Ingredient | Amount, lbs. |
| --- | --- |
| Liquid epoxy resin (marketed under the trade designation "ERL 2795" by Bakelite Co.) | 224 |
| Dibutyl phthalate | 15 |

COMPONENT 2

| Ingredient | Amount, lbs. |
| --- | --- |
| Liquid polyamide resin (marketed under the trade designation "Versamid 115" by General Mills, Inc.) | 120 |

COMPONENT 3

| Ingredient | Amount, lbs. |
| --- | --- |
| White sand washed free of soluble salts | 960 |
| Carbon black | 30 |

Each of the above three components was packaged in separate containers containing proportionate amounts of the components as in Examples 1 and 2. The components were mixed as in Example 1 and as applied had the following percentage by weight composition.

Ingredient: Percent by weight
    Liquid epoxy resin _____ 16.61
    Liquid polyamide resin _____ 8.89
    Sand _____ 71.17
    Carbon black _____ 2.22
    Dibutyl phthalate _____ 1.11

It will be understood that compositions including other fillers and different proportions of the components than those specified in the foregoing examples may be prepared and are useful in the practice of the invention.

In view of the above, it will be seen that the several objects of the invention are achieved and other advantageous results attained.

As various changes could be made in the above products and methods without departing from the scope of the invention, it is intended that all matter contained in the above description or shown in the accompanying drawing shall be interpreted as illustrative and not in a limiting sense.

I claim:

1. A method of resurfacing and patching concrete surfaces which comprises applying to said surfaces a composition consisting essentially of approximately 8–80% by weight of a liquid epoxy resin containing terminal epoxy groups and having an epoxide equivalent of not greater than about 290, approximately 4–60% by weight of a liquid polymeric polyamide curing agent having an amine number greater than 83, said curing agent being a condensation product of dimer acids and polyamines, approximately 16–80% by weight of a filler, and not more than approximately 1% by weight of an alkyl phthalate, and thereafter curing said composition in situ.

2. A method of resurfacing and patching concrete surfaces which comprises applying to said surfaces a composition consisting essentially of approximately 13% by weight of a liquid epoxy resin containing terminal epoxy groups and having an epoxide equivalent of not greater than about 290, approximately 7% by weight of a liquid polymeric polyamide curing agent having an amine number greater than 83, said curing agent being a condensation product of dimer acids and polyamines, approximately 80% by weight of sand washed free of soluble salts, and not more than approximately 1% by weight of an alkyl phthalate, and thereafter curing said composition in situ.

3. A method of resurfacing and patching concrete surfaces which comprises applying to said surfaces a composition consisting essentially of approximately 14% by weight of a liquid epoxy resin containing terminal epoxy groups and having an epoxide equivalent of not greater than about 290, approximately 7% by weight of a liquid polymeric polyamide curing agent having an amine number greater than 83, said curing agent being a condensation product of dimer acids and polyamines, approximately 60% by weight of sand washed free of soluble salts, approximately 17% by weight of a compound selected from the group consisting of aluminum silicate, calcium silicate, and magnesium silicate, approximately 2% by weight of a pigment selected from the group consisting of red oxide of iron and carbon black, and not more than approximately 1% by weight of dibutyl phthalate, and thereafter curing said composition in situ.

4. A resurfaced concrete structure which comprises a layer of a cured composition firmly bonded and adhered to a concrete surface, said composition in an uncured state consisting essentially of approximately 8–80% by weight of a liquid epoxy resin containing terminal epoxy groups and having an epoxide equivalent of not greater than about 290, approximately 4–60% by weight of a liquid polymeric polyamide curing agent having an amine number greater than 83, said curing agent being a condensation product of dimer acids and polyamines, approximately 16–80% by weight of a filler, and not more than approximately 1% by weight of an alkyl phthalate.

5. A resurfaced concrete structure which comprises a layer of a cured composition firmly bonded and adhered to a concrete surface, said composition in an uncured state consisting essentially of approximately 13% by weight of a liquid epoxy resin containing terminal epoxy groups and having an epoxide equivalent of not greater than about 290, approximately 7% by weight of a liquid polymeric polyamide curing agent having an amine number greater than 83, said curing agent being a condensation product of dimer acids and polyamines, approximately 80% by weight of sand washed free of soluble salts, and not more than approximately 1% by weight of an alkyl phthalate.

References Cited in the file of this patent

UNITED STATES PATENTS

| | | |
|---|---|---|
| 2,705,223 | Renfrew et al. | Mar. 29, 1955 |
| 2,760,944 | Greenlee | Aug. 28, 1956 |
| 2,773,338 | Carter | Dec. 11, 1956 |

FOREIGN PATENTS

| | | |
|---|---|---|
| 516,107 | Canada | Aug. 30, 1955 |

OTHER REFERENCES

Rouse et al.: Paint, Oil and Chemical Review, 116, No. 23, pp. 72–80 (1953).

Renfrew et al.: Ind. Eng. Chem. 46, 2226–32 (1954).